(12) United States Patent
Nagata et al.

(10) Patent No.: US 11,401,450 B2
(45) Date of Patent: Aug. 2, 2022

(54) FLUID SYNTHESIS SYSTEM

(71) Applicant: Nikon Corporation, Tokyo (JP)

(72) Inventors: Takashi Nagata, Castro Valley, CA (US); Ting-Chien Teng, Belmont, CA (US); Nobutaka Magome, Belmont, CA (US); Bausan Yuan, Belmont, CA (US)

(73) Assignee: Nikon Corporation

( * ) Notice: Subject to any disclaimer, the term of this patent is extended or adjusted under 35 U.S.C. 154(b) by 605 days.

(21) Appl. No.: 16/518,201

(22) Filed: Jul. 22, 2019

(65) Prior Publication Data

US 2019/0338174 A1    Nov. 7, 2019

Related U.S. Application Data

(63) Continuation-in-part of application No. PCT/US2018/019092, filed on Mar. 9, 2018.

(60) Provisional application No. 62/462,508, filed on Feb. 23, 2017.

(51) Int. Cl.

| B01D 36/04 | (2006.01) |
| C09K 3/14 | (2006.01) |
| B01D 21/02 | (2006.01) |
| B01D 37/00 | (2006.01) |
| B01F 23/50 | (2022.01) |
| C09G 1/02 | (2006.01) |

(52) U.S. Cl.
CPC ............ *C09K 3/1463* (2013.01); *B01D 21/02* (2013.01); *B01D 37/00* (2013.01); *B01F 23/51* (2022.01); *C09G 1/02* (2013.01); *B01F 23/581* (2022.01)

(58) Field of Classification Search
CPC ...................................................... C02F 1/001
USPC ........................................................ 210/182
See application file for complete search history.

(56) References Cited

U.S. PATENT DOCUMENTS

2018/0273856 A1* 9/2018 Bartolini .............. B01D 63/022

FOREIGN PATENT DOCUMENTS

| JP | H0631802 U | 4/1994 |
| JP | 2000273443 A | 10/2000 |
| JP | 2001009706 A | 1/2001 |
| JP | 2006043781 A | 2/2006 |
| WO | WO2005017989 A1 | 2/2005 |

OTHER PUBLICATIONS

Office Action issued by the China National Intellectual Property Office dated Mar. 8, 2022, in Japan Patent Application Serial No. 2019-546789.

* cited by examiner

*Primary Examiner* — Gregory E Webb
(74) *Attorney, Agent, or Firm* — Roeder & Broder LLP; Steven G. Roeder

(57) ABSTRACT

Fluid synthesis system and corresponding method for synthesis of slurry containing abrasive particles. The system and method are configured to substantially segregate the abrasive particles passing through the filter, used at the filtering step of the process, from the sticky components that clog such filter prior to the filtering step of the synthesis process to achieve a sustaining filtration of the slurry as a result of which the filter remains substantially unclogged for the whole predetermined duration of the filtering process.

12 Claims, 6 Drawing Sheets

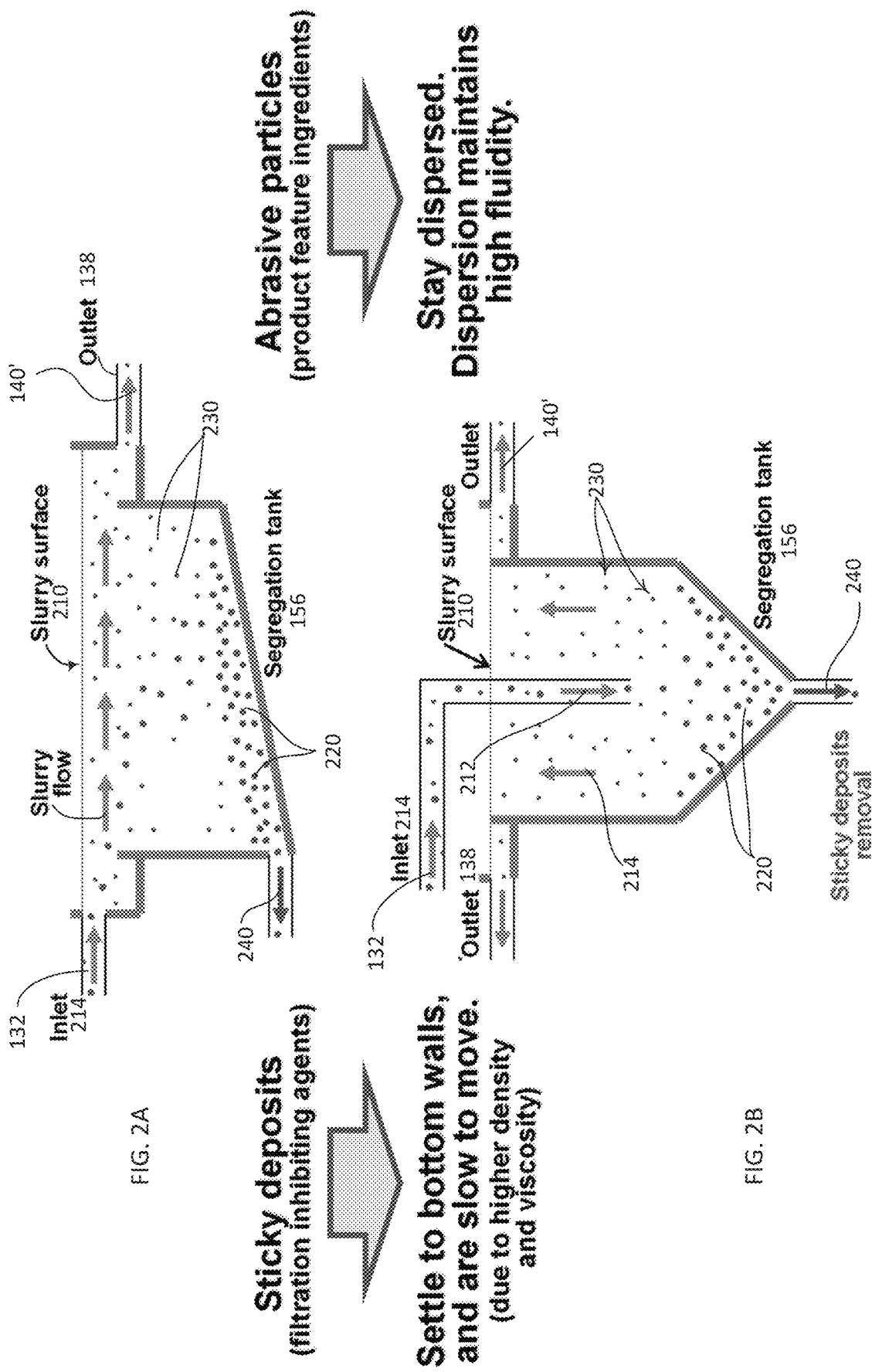

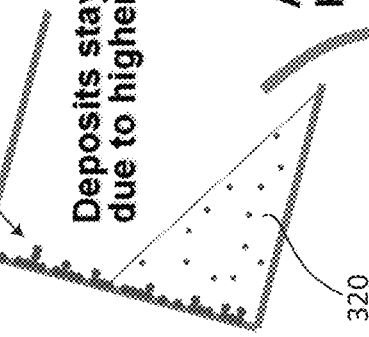
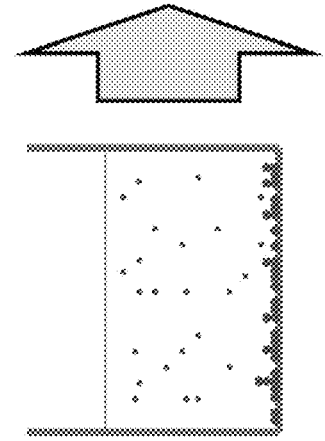
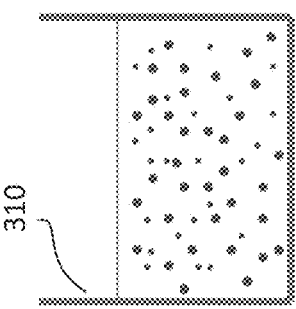
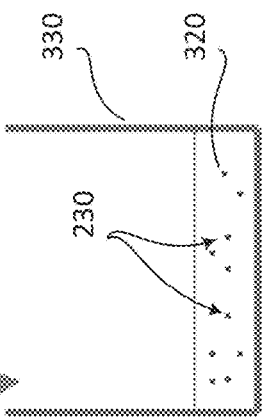
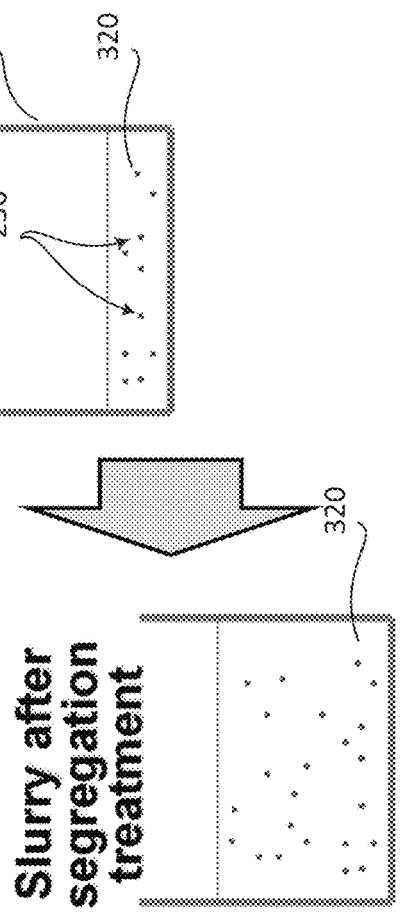

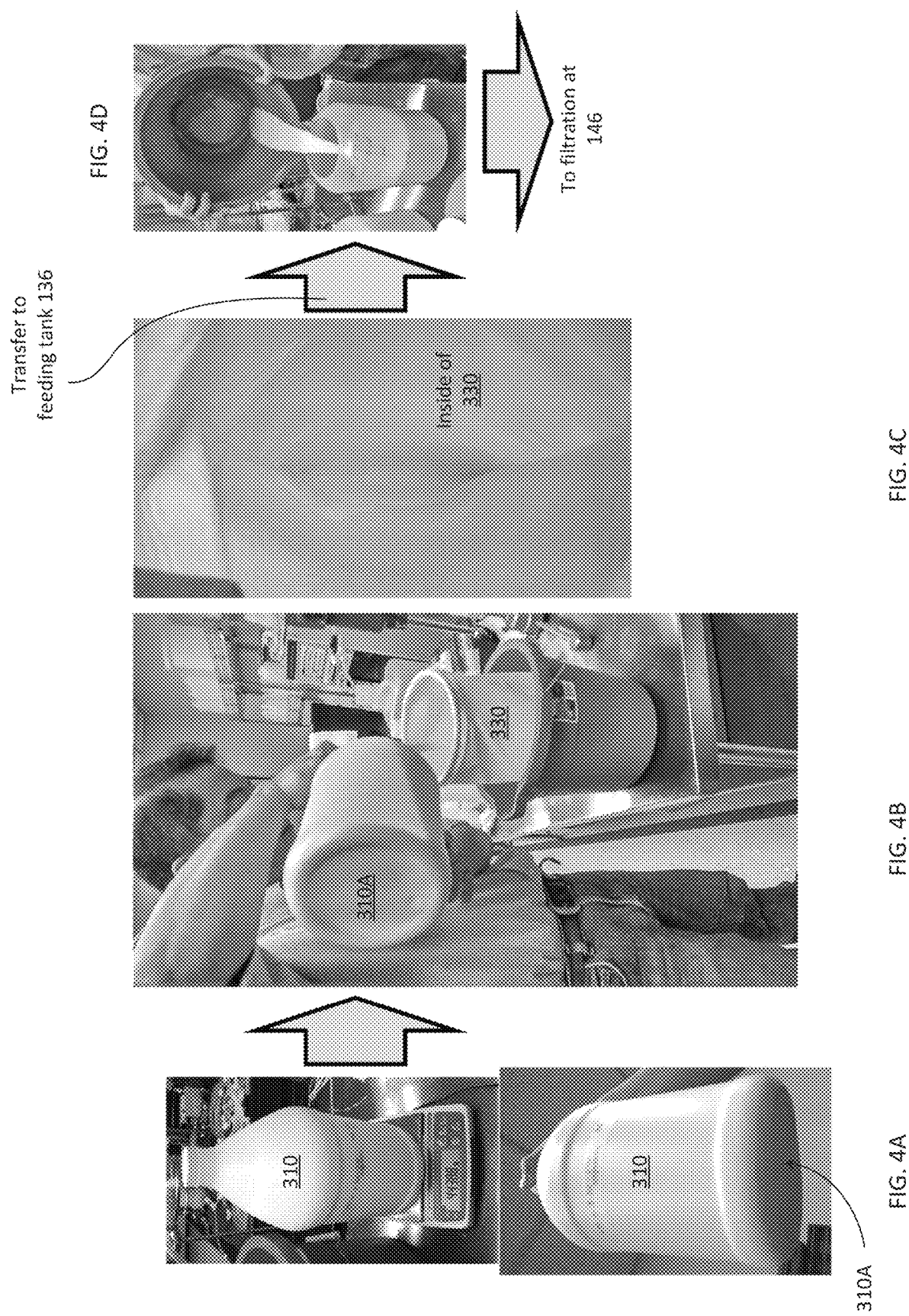

X5 slurry, 5μm 10-inch cartridge filtration by air pressure

X5 slurry, 5μm 10-inch cartridge filtration by air pressure

X5 slurry, 5μm 10-inch cartridge filtration by air pressure

X5 slurry, 0.5μm 10-inch cartridge filtration by air pressure

FLUID SYNTHESIS SYSTEM

CROSS-REFERENCE TO RELATED APPLICATIONS

This application is a continuation-in-part from the International Patent Application PCT/US2018/019092, filed on Mar. 9, 2018, that claims priority from and benefit of a U.S. Provisional Patent application No. 62/462,508, filed on Feb. 23, 2017. The disclosure of each of the above-identified applications is incorporated herein by reference.

TECHNICAL FIELD

Embodiments of the present invention relate to abrasive-slurry manufacturing process.

BACKGROUND

The operational capabilities of conventional abrasive slurry manufacturing processes are often restricted by the quality of the slurry used in the processes. The quality of the slurry, understandably, at least in part depends on the ability of the user to properly filter the slurry prior to using it in the process. The success of the filtering step (interchangeably referred to herein with the use of a term "refinement by filtration" or a similar term), in turn, turns at least in part on whether the filters operate as intended or "misbehave" and/or deteriorate for some reason.

SUMMARY

Embodiments provide system and method for manufacturing abrasive slurry. The method includes: (i) in a dispersing portion of said system, forming a first suspension of material, the first suspension containing abrasive solid particles in a fluid medium; (ii) in a segregating portion of said system, segregating viscous components contained in said first suspension from said first suspension to form a second suspension of the abrasive solid particles in said fluid medium; and (iii) in a filtration portion of said system, filtering the second suspension by passing the second suspension through at least one filter to remove particles with dimensions exceeding threshold dimensions.

BRIEF DESCRIPTION OF THE DRAWINGS

The invention will be more fully understood by referring to the following Detailed Description of Specific Embodiments in conjunction with the not-to-scale Drawings, of which:

FIGS. 2A, 2B are schematic diagrams illustrating hardware configured to effectuate a segregating step 112 of the fluid synthesis process of FIG. 1;

FIGS. 3A, 3B, 3C, and 3D illustrate a simplified experiment providing experimental verification of the efficiency of the segregation step of FIG. 1;

FIGS. 4A, 4B, 4C, and 4D also illustrate a simplified experiment providing experimental verification of the efficiency of the segregation step of FIG. 1;

Figure 1:
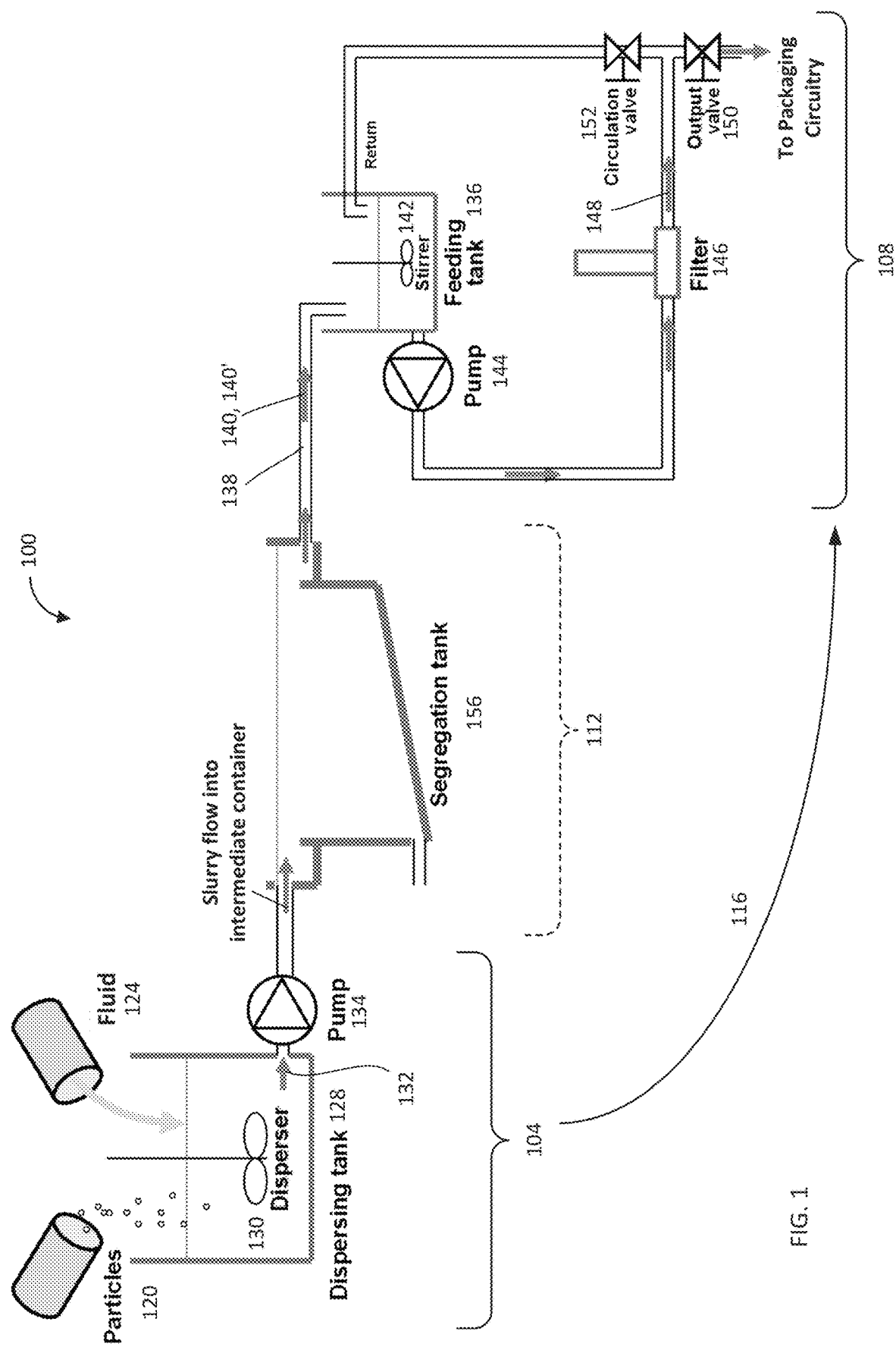
FIG. 1 is a schematic diagram illustrating both the fluid synthesis system and the associated process of a conventionally-configured fluid synthesis (in case of sequentially-arranged steps 104 and 10) and an embodiment of the invention (in case including the step 112, intervening between the steps 104 and 108)

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Conventionally, the abrasive slurry is formed by, for example, dispensing of appropriate particles or elements in the host medium, and the slurry material resulting from such dispensing is then further refined by filtration. Such conventional method forces, upon the user, and necessitates heavy usage and frequent replacements of particle filters, which therefore become vital to quality control of abrasive slurry manufacturing. Indeed, because the slurry as initially prepared is a stirred mixture of solid particles and suspension medium fluid or liquid (with a plenty of viscous substances such as particle agglomerates), the viscous substance components in the feed slurry attack the filter and act as filtration-inhibiting agents and, for example, clog the used filter or inhibit its operational qualities otherwise. As a result, a typical refinement process requires a large number of filters to be used and/or sacrificed before the desired quality of filtration and/or desired amount of filtrate is, finally, achieved. The lack of good slurry pretreatment steps implemented before the step of filtration reduces productivity and increases manufacturing costs as a result of mounting filter replacements (and also likely contamination of the final product slurry, since the viscous substances can still leach out through the filter(s)).

In other words, the unresolved, persisting in the currently-used fluid-synthesis processes problem can be ascertained as a problem caused by a process of operation—of a conventional filtering system for use with a manufacturing line of a fluid (such as an abrasive slurry made from particle dispersed in a fluid medium)—that is not refined for pre-treatment of the prepared slurry to alleviate or even avoid the operational load on the slurry-filtering line.

Phrased differently, the persisting operational problem associated with the conventional fluid-synthesis process stems from the inability of currently-employed process to easily effectuate fluid refinement by filtration due to limited availability of the currently used methodologies to neutralize filtration-inhibiting agents that exist in the fluid being filtered. The present embodiment(s) addresses this problem, and solves it by introducing a judiciously defined treatment of fluid in the manufacturing system prior to the step of filtration. At the step of such treatment (or pre-treatment), the filtration-inhibiting agents present in the fluid are at least partially and preferably substantially completely removed (i) by means of segregation (such as sedimentation); and/or (ii) by utilizing the differences in physicochemical properties (such as density or viscosity, for example) among constituent substances (that is, sought-after product ingredients such as abrasive particles versus filtration-inhibiting agents such as sticky deposits); and/or (iii) by properly configuring a fluid segregation processing unit or system (for example, a tank, an inlet to the tank, and an outlet from the tank, installed prior to filtration) to allow for an optimized used of filtration in fluid refinement process. The practical implementation of embodiment(s) of the invention proved to achieve a technical effect of lengthening the life of a typical currently-used filter (and, in particular, the filter characterized by a 99.9% particle removal rate for particles with diameters exceeding 500 nm).

To facilitate the optimization of the process of the synthesis of a target fluid suspension in a manufacturing line (where fluid refinement by filtration of the fluid has to be carried out), embodiment(s) of the invention provide a framework for fluid pretreatment of the slurry prior to the step of filtration, in order to neutralize trouble-causing filtration-inhibiting agents present in the fluid (such as, for example, sticky deposits in the case of abrasive slurry synthesis) while, at the same time, retaining important product ingredients (e.g., abrasive particles of the slurry) on order to make the subsequent filtration step of the process more efficient, and without affecting the quality of the final product fluid suspension. As a result, both the fluid-processing system adapted to accommodate such pretreatment process(es) and the implementation of the overall slurry-refining methodology improves efficiency and reduces costs in synthesizing industrial exotic fluid while securing the final product quality. The progress of the proposed fluid-refinement process and its results are detected and controlled with the use of proposed hardware configurations and/or measurement data collected in situ.

In reference to FIG. 1, schematically tracing a slurry synthesis process 100 (shown to include both the conventional steps 104, 108 and the newly-proposed intermediate step 112), the idea of the present invention stems from the realization that the segregation of the constituent components of the fluid suspension process, carried out between the conventional particle dispersing in a fluid and a fluid-suspension filtration process (in the example of abrasive slurry synthesis) allows for and lends itself to "pretreatment" of the target composition prior to filtration, which pretreatment achieves the desired results and which is non-existent in conventional processing methodologies.

Conventionally-used methodologies embraced the strategy of processing filtration (step 108) without any delay—that is, immediately following, as shown with the arrow 116—the step 104 of dispersing the target particles 120 in the target fluid 124 (typically in some sort of a dispensing tank 128, with the use of an appropriate dispersing mechanism, 130). In the simple example, the flow 132 of slurry, formed in the tank 128, is directed—optionally with the use of an appropriate pump 134—into the feeding tank 136 through a pipe of slurry-guide 138, in this conventional case directly fluidly connecting the tanks 128, 136 without any intervening containers or volumes. In a conventionally configured process, therefore, the slurry formed in the dispersing tank 128 is directly delivered into the feeding tank 136 as a slurry flow 140. (The numeral 140', also used in FIG. 1 to label the slurry flow entering the filtration portion 108 of the process/system, is used to refer to the slurry that is segregated as a result of the implementation of the process to be discussed below.)

Appropriately agitated and whirled with the stirrer 142, the slurry from the feeding tank 136 is further pumped by a pump 144 to and through a slurry filter 146. As a throughput flow 148, the filtered slurry is further delivered to the valve circuitry typically including at least one output valve 150 (through which the slurry the quality of which satisfies the pre-determined conditions is redirected to be appropriately packed and/or stored for future use) and at least one circulation valve 152 (configured to provide a return venue for recirculation of the sub-par or not-yet-refined-enough slurry back to the stirring mechanism 142 and through the filtration loop 108 yet again). It is appreciated that the sensing and/or measurement and/or data-processing electronic circuitry (that collects, in operation, the measurement data representing the flow of the particle dispersing process 104 and/or filtration process 108 and governs the operation and/or changes in the operation of at least one of these processes) is operably connected with at least some of the driver of the disperser 130 (not shown for simplicity of illustration); the pumps 134, 144; the driver of the stirring mechanism 142 (not shown); the valve circuitry 150, 152; and the filtering unit 146.

Such conventionally-configured processing approach is well accepted in related art and has a practical reason behind it: the above-described two-step synthesis process (two sequential steps 104 and 108) does not provide any time for the dispersed substances in the slurry flow 132, 140 to deposit or separate from the slurry before the slurry is filtered at 146, thereby preventing the loss of the material substance of the slurry product. In reality, however, the imperfect nature of the particle dispersing process 104 as well as material impurities from the particle batch 120 often cause filtration-inhibiting (filter-clogging) agents of the material(s) in the particle batch 120 to remain in the slurry formed in the dispersing tank 128. Such agents cannot be filtered out efficiently since, due to their very viscous nature, these agent clog up particle filter(s) 146 thereby disabling the filtration function at step 108 and, effectively, negating the idea of filtration and preventing the filtration step 108 from being efficiency implements. Additionally, the filter-clogging agents present in the slurry filtered at 146 cause the use to frequently replace the filtering components of the unit 146.

In further reference to FIG. 1, embodiments of the invention address this situation by introducing an intermediate step 112 of slurry segregation prior to the step 108 of slurry filtration. The implementation of the segregation step 112 (carried out with the use of the segregation tank 156, as shown in the example of FIG. 1) is independent from and does not rely on any filtration mechanism of the overall slurry synthesis system, and therefore enables the slurry synthesis system to effectively remove the filtration-inhibiting agents from the slurry, thereby improving the operation and longevity of the filtering unit 146.

The overall schematic of FIG. 1, therefore—inclusive of all three schematically-presented components 104, 112, and 108—represents embodiments of the slurry synthesis system and process configured according to the disclosed idea. As shown, in the specific example of abrasive slurry synthesis, slurry suspension that comes out of a particle dispersing process contains substances that cause sticky deposits (filtration-inhibiting agents) exist alongside the abrasive particles (which are desired product feature ingredients). The slurry suspension enters a segregation process that, in one embodiment, includes a segregation tank, through an inlet.

FIGS. 2A, 2B address specific details of related embodiments of the segregation portion 112 of the overall process and/or slurry synthesis system 100 of FIG. 1. Here, the process of segregation of the constituent components of the suspension 132, formed as a result of the particle dispensing at step 104, is shown to be independent from any filtration methodology conventionally employed by related art. The pre-treatment process of slurry segregation 112 possesses the ability to remove the aforementioned filtration-inhibiting agents effectively and efficiently, saving time and reducing costs of the overall synthesis process by facilitating better uses of the filters' particle selection capabilities in the subsequent filtration process.

Two related and non-limiting embodiment of the segregation process and/or sub-system are shown. FIG. 2A illustrates schematically a configuration in which the in-flow of the dispersed slurry 132 is directed through the segregation tank 156 towards the outlet(s) 138 substantially along a surface 210 of the slurry accumulated in the segregation tank 156. FIG. 2B illustrates schematically a related configuration in which the in-flow of the dispersed slurry 132 is directed through the segregation tank 156 substantially transversely to the surface 210, while the out-flow of the (already segregated) slurry 140' through the outlet 138 towards the filtration section 108 of the system 100 is directed substantially parallel to the surface 210. When so-delivered, the direction of the in-flow 212 of dispersed slurry 132 is substantially reversed (as shown with arrows 212, 214) during the segregation process prior to forming an out-flow 140', the direction of which is transverse to the direction of the in-let flow 212. Optionally, any of the inlet 214 and outlet leading to/from the segregation tank may be present in the system as a multiplicity of (inlets/outlets), as shown, for example, in FIG. 2B illustration two outlets from the tank 156.

As the slurry 132 passes through the tank 156 from the inlet 214 to the outlet 138, the sticky deposit components 220 of the slurry 132, with their agglomerating properties and higher density and/or viscosity (as compared with those of the remainder of the dispersed slurry material), move slower across/along the tank 156 than the rest of the suspension and settle down to the bottom and/or walls of the tank 156 (and can be later or contemporaneously removed, as shown with 240). At least one of the bottom and/or walls of the tank 156 is configured to ensure that, in operation, it is appropriately inclined with respect to the surface 210 to facilitate the removal of the components 220 through the dump outlet, as shown with the arrow 240 (under gravity and/or with the use of a dedicated suction/pump unit; not shown). The abrasive particles 230, on the other hand, stay dispersed in the fluid passing through the tank 156 as they do not efficiently agglomerate and, as a result of such difference in properties, the remaining portion of the suspension 132 that entered the tank 156 maintains high fluidity. Therefore, when the slurry suspension 140' comes out from the outlet 138 of the tank 156, it is refined (as compared to the entering-the-segregation-tank flow of slurry 132) due to sedimentation of the sticky, viscous, undesired components while the abrasive particles remain plentiful in the slurry 140'.

In one embodiment, to succeed with the realization of the segregation step 112 of the slurry-synthesis process in practice, attention should be paid to the substance selection through segregation by, for example, judiciously coordinating the fluid flow rate through the tank 156 and the volume of the tank 156. These values are chosen in accord with slurry substance properties, such as density and viscosity. The product of the tank volume and the value that is reciprocal to the fluid flow rate is representative of how long the fluid suspension should remain in the tank for the segregation process to proceed as intended and/or successfully.

To illustrate this approach in practical terms, we assess— whether theoretically or empirically based on correlation with the inherent substance properties (such as density and viscosity) of the processed fluid suspension—that the fluid suspension requires 10 minutes for its segregation process to properly proceed in the tank, and additionally assume that the production management of the fluid suspension requires the process flow rate to be 10 liters per minute (LPM). From these considerations it is stated that the numeral describing the length of time the fluid suspension should remain in the tank (in this case, 10 [minutes]) should equate to the product of the numeral describing the tank volume and the numeral that is equal to the reciprocal the fluid flow rate (in this case, 10 [LPM]) from which the tank volume require for the segregation process can be assessed as 100 [liters], in order for the segregation process of the fluid suspension to proceed properly. In another example, we suppose the tank volume has been predetermined as 10 gallons (=37.85 liters) from the hardware design constraints of the fluid suspension production system. We also suppose that we process the same fluid suspension as the previous example, thus requiring 10 minutes for its segregation process to properly proceed in the tank due to the inherent substance properties of the processed fluid suspension. From these settings, it can be stated that 10 [minutes], i.e. the length of time the fluid suspension should remain in the tank, should equate to the product of the tank volume 10 [gallons] and the value reciprocal of the fluid flow rate, deducing the required fluid flow rate as 1 [gallon per minute (=3.785 LPM)] for the segregation process of the fluid suspension to proceed properly.

The preferred segregation time is related to the product of the tank volume and a value reciprocal to the flow rate. It was empirically determined that in case when the duration of the segregation portion 112 of the process is substantially shorter than the product of above-identified values, then, for the same fluid, either a) the required tank volume can be reduced for the same flow rate without affecting the efficiency of the process, orb) the processing can be commenced as a higher flow rate for the same tank volume without affecting the efficiency of the segregation process. In case when the duration of the segregation portion 112 of the process is substantially longer than such product, for the same given fluid, it was empirically determined that the processing requires either (a) the larger tank volume for a fixed flow rate, or (b) the slower flow rate for a fixed tank volume.

Referring now to FIGS. 3A, 3B, 3C, 3D and 4A, 4B, 4C, and 4D, as a simple way to test the segregation process 112, we applied the idea of "settling & pouring" to slurry 132 that resulted from the particle dispersing step 104 (in the example of abrasive slurry process). The initial slurry suspension 132, formed by the particle dispersing process, contained both sticky deposits and abrasive particles. When the slurry 132 was fed to the subsequent filtration process "as-is" (that is un-refined, FIG. 3A), the filter(s) were clogged up rapidly due to the presence of the sticky deposits 220. To counter and/or compensate this effect, the initial slurry 132 was first settled in a container, FIG. 3B, to allow for the sticky deposits to pile on the bottom of the slurry container 310 due to their higher density of the deposits coming from its de-agglomerating property. After settling, the slurry container 310 was tilted to quietly pour out the somewhat-refined (as a result of settling), second slurry product 320 to another container 330. The sticky deposits 220 remained on the bottom of the first container 310 and were not transferred to the contained 330, due to their higher viscosity, and the slurry 320 that was poured out (FIG. 3C) kept most of the abrasive particles 230 with it due to its dispersing property, thereby resulting in a batch full of slurry possessing after-segregation properties (FIG. 3D). As a simple sanity check, a filter bag (with the net spacing of about 1 micron) was be used to receive the without shaking and slowly poured out slurry 320 to verify that the treated slurry does not contain the sticky deposits 220 (which was determined by lack of coloration, such as reddish, caused in known cases by the presence of the sticky deposits) and that such resulting slurry 320 passed through the filter bag without any further substantial clogging and/or residues.

FIGS. 4A, 4B, 4C, and 4D illustrate the practical implementation of the experimental verification described in reference to FIGS. 3A, 3B, 3C, and 3D. Here, FIG. 4A includes two views of the container 310 (one on the weight scales and another—with the outside of the bottom of the container visible to the viewer). FIG. 4B corresponds to the step described in reference to FIG. 3C, while FIG. 4C provides a view of the inside of the filter bag (used as a container 330) after the slurry 320 has been filtered through it. The inside surface(s) of the filter 330 clearly are devoid of any visibly-identified coloration, thereby indicating no stain(s) produced by the presence of sticky deposits 220 and, therefore, the substantial lack of such deposits in the filter bag 330. The transition from FIG. 4C to FIG. 4D represents the transfer of the slurry, refined through the segregation process, to the feeding tank 146 (compare with FIG. 1) and then on to the filtration sub-set portion of the process.

Accordingly, an embodiment of the process of segregation includes forming sediments of the viscous components of the first, entering a chosen container, suspension on a bottom of such container. The process of formation of the sediments may include forming the sediments on the bottom of the container through which such suspension flows and, optionally, further including removing the sediments from the bottom of the container while such suspension continues to flow through the container. The process may include the step of delivering the first suspension into the chosen container with a flow directed substantially transversely to a surface of fluid present in the container as a result of such delivering. In a related embodiment, the process may include the step of delivering the first suspension into the chosen container with a flow directed substantially parallel to a surface of fluid present in the container as a result of such delivering. Alternatively, the process of segregation may include forming the sediments while the suspension that entered the chosen container is contained in and does not flow through the chosen container (that is, is "still" or substantially motionless), and optionally further including removing the somewhat refined (as a result of the step of removing the sediments), second suspension from the chosen container while leaving the sediments in the chosen container.

Figure 5A:
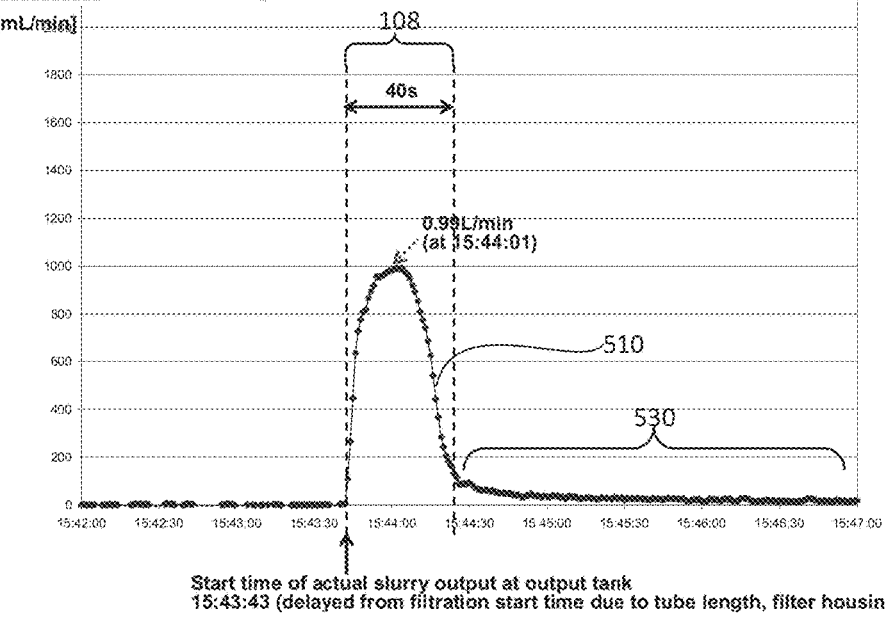
FIGS. 5A and 5B are plots representing empirical results of measurements of the filtration flow rate and filtration pressures at the step 108 of the process of FIG. 1 in absence of the segregation step 112, thereby describing the performance of the filtration portion of the system of FIG. 1 that is configured according to the principle accepted in related art.
Figure 5B:
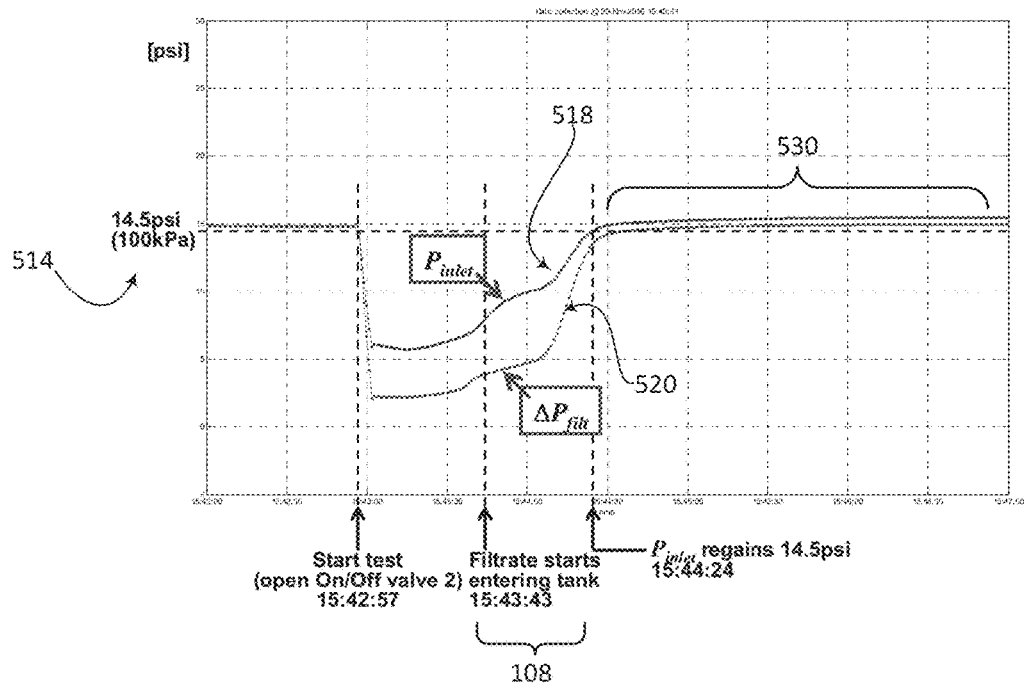
Figure 6A:
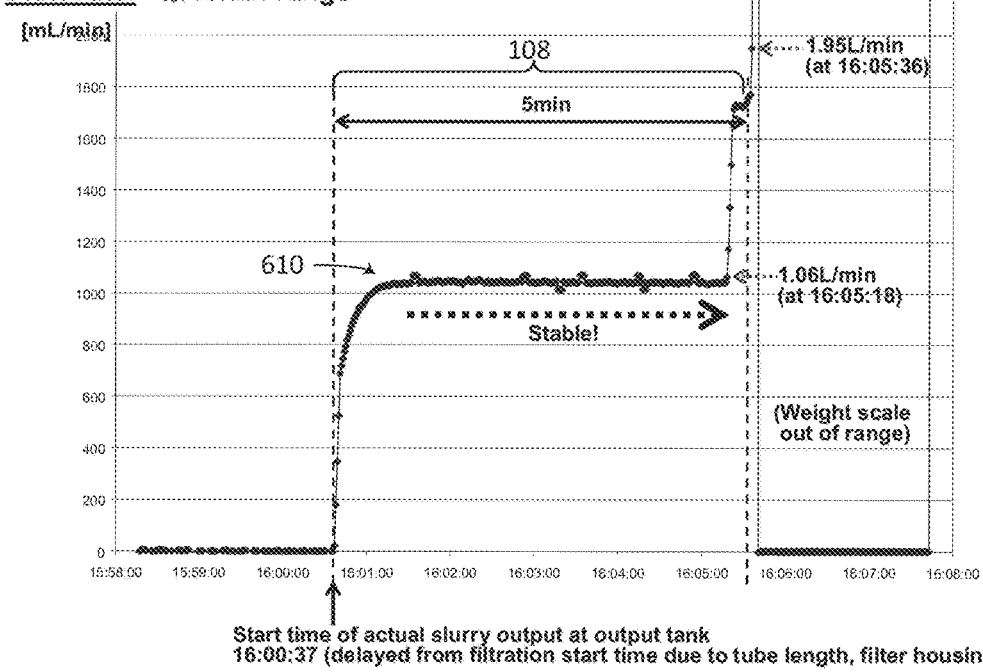
FIGS. 6A and 6B are plots representing empirical results of measurements of the filtration flow rate and filtration pressures at the step 108 of the process of FIG. 1 once the segregation step 112 is implemented, according to an embodiment, between the dispersion step 104 and the filtration step 108 of the process of FIG. 1, thereby describing the performance of the filtration portion of the system of FIG. 1 that is configured according to the principles proposed in this disclosure.
Figure 6B:
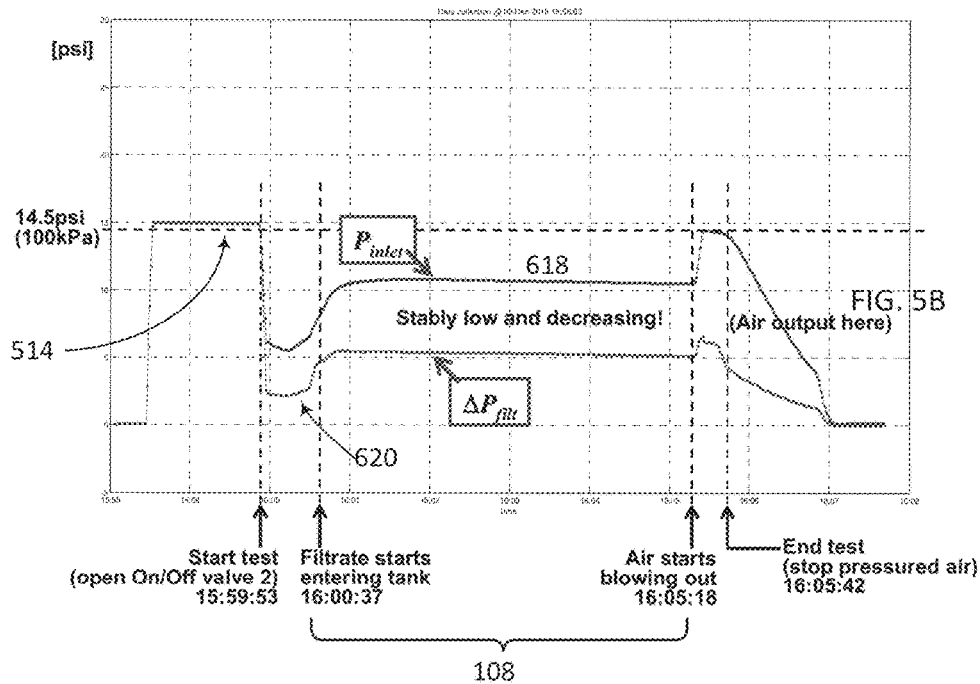

As illustrated in the plots of FIGS. 5A, 5B, 6A, 6B, the empirical results of the slurry filtration tests evidence the effectiveness of the segregation-pretreatment step introduced prior to the filtration step, according to the idea of the invention. Here, FIGS. 5A, 6A present the plots describing the flow rates of the slurry through the filter 146 (the parameters of which are indicated) during the filtration portion 108 of the process 100 without the segregation pre-treatment and with the segregation pre-treatment, respectively. FIGS. 5B, 6B illustrate pressure parameters characterizing the filtration system during the filtration step 108 of the process 100 (with and without the pre-treatment of the slurry at step 112, respectively).

In reference to FIGS. 5A, 5B for example, a person of the ordinary skill will readily recognize that, when a batch of slurry without segregation pretreatment is used as input to a filtration process 108 under a constant slurry feeding pressure (shown as 510; in this example—at about 100 kPa), the filtration flow rate (curve 514) rises up initially while filtration pressures (curves 518, 520) drop, indicating a low initial flow resistance of the filter 146. However, the filtration flow 510 rate quickly decays (within a time window t1, shown as about 40 seconds in this example) and then approaches a substantially zero level, while simultaneously the levels of the filtration pressures (FIG. 5B) quickly increase to the slurry-supplying pressure level 514 (which level is, effectively, the maximum filtration pressure level achievable in the system). These results indicate that the efficient filtration of the slurry has ceased with a very high (substantially, infinite—for practical purposes) resistance to the slurry flow through the filter 146. The portion 530 of the graphs of FIGS. 5A, 5B indicate, therefore, a substantially complete clogging of the filter, leading to and causing a typical case of non-sustainable (or non-sustaining) filtration.

In reference to FIGS. 6A, 6B, however, and in contradistinction with such conventional processing results of FIGS. 5A, 5B, when another batch of slurry is identically prepared but, in addition, is subjected to the segregation-pretreatment processing step 112 and only after that applied/introduced to the same filtration process 108 (with the same conditions and settings, such as, for example, feed supplying pressure 514 and filter rating), the filtration flow rate 610 increases and filtration pressure levels (curves 618, 620) drop only initially. The filtration flow rate 610 now substantially maintains at a constant level (indicated, in the example of FIG. 6A as about 1.06 L/min) with no decreases, and simultaneously the filtration pressures 618, 620 maintain at constant levels (shown as $P_{inlet}$ and $\Delta P_{filt}$) that are both lower than the slurry supplying pressure 514. These results indicate a low and unchanged filter-flow resistance maintained from the beginning of and during the filtration step 108, thereby attesting to a substantially lack of clogging of the filter 146 (that was conventionally causes by the lack of the pre-treatment step 112 of the process). These results demonstrated with the inclusion of the segregation step 112, therefore, are referred to as "sustaining" (or sustainable) filtration.

It is appreciated, therefore, that embodiments of the invention enable a system design and an execution of fluid synthesis process that are optimized for both manufacturing efficiency and product quality, as well as better understanding of load balancing among different subcomponent processes within an overall fluid synthesis process.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

For example, a reference to a flow rate (or rate of flow) remaining substantially unchanged as a constant level is to be construed as the flow rate the value of which does not deviate from such constant level by plus or minus 10%, more preferably plus or minus 5%, most preferably plus or minus 2%. A reference to a flow rate to remain substantially unchanged substantially for a whole duration of the specified time-window is to be construed as preserving the flow rate at a substantially constant level for a duration that differs from the duration of the specified time-window by no more that 20%, preferably no more than 10%, even more preferably by no more than 5%, and most preferably by no more than 2%.

Other specific examples of the meaning of the terms "substantially", "about", and/or "approximately" as applied to different practical situations may have been provided elsewhere in this disclosure.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

With the improved fluid treatment capability, fluid synthesis controllers can be readily designed so as to realize the optimal performance without exhaustive on-site tunings. The presence and/or operation of such (optionally) programmable controller (not shown in the drawings for the simplicity of illustration but, if used, configured to govern the operation of at least one of the portions of the system and/or processing steps 104, 112, 108) may necessitate an inclusion, in an embodiment of the invention, a specifically-programmed computer-readable processor controlled by instructions stored in a tangible, non-transitory storage memory. Such processor may be appropriately programmed to govern the operation of the embodiment and/or collect data acquired during such operation, in order to extract and process information pertaining to a given measurement conducted during the operation of the embodiment. The memory may be random access memory (RAM), read-only memory (ROM), flash memory or any other memory, or combination thereof, suitable for storing control software or other instructions and data. Instruction information may be conveyed to a processor through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Disclosed aspects, or portions of these aspects, may be combined in ways not listed above. Accordingly, the invention should not be viewed as being limited to the disclosed embodiment(s).

What is claimed is:

1. A method for manufacturing abrasive slurry with a slurry synthesis system, the method comprising:
   in a dispersing portion of said system, forming a first suspension of material, the first suspension containing abrasive solid particles in a fluid medium;
   in a segregating portion of said system, segregating viscous components contained in said first suspension from said first suspension to form a second suspension of the abrasive solid particles in said fluid medium; and
   in a filtration portion of said system, filtering the second suspension by passing the second suspension through at least one filter to remove particles with dimensions exceeding threshold dimensions.

2. A method according to claim 1, wherein said segregating includes forming the second suspension in which a relative portion of the abrasive solid particles exceeds that in the first suspension.

3. A method according to claim 1, wherein the segregating includes forming sediments of said viscous components on a surface of a container containing the first suspension, said surface being inclined with respect to a surface formed by the first suspension in the container.

4. A method according to claim 3, wherein the segregating includes forming sediments of said viscous components on said surface of the container while leaving abrasive solid particles suspended in the fluid medium above the sediments.

5. A method according to claim 3, wherein the forming includes forming said sediments on said bottom of the container while the first suspension is flowing through the container.

6. A method according to claim 5, further comprising removing the sediments from the bottom of the container while the first suspension continues to flow through the container.

7. A method according to claim 3, wherein the segregating includes forming said sediments while the first suspension is fully contained in and does not flow through the container.

8. A method according to claim 7, further comprising at least one of (i) removing the second suspension from the container while leaving the sediments in the container and (ii) removing the sediments from the container while extracting the second suspension from the container.

9. A method according to claim 1,
wherein said segregating is carried out in a chosen container, and
further comprising:
delivering the first suspension of the material to said container along a first axis that is transverse to a surface formed by the first suspension in the chosen container, and
removing the second suspension from the container along a second axis that is substantially parallel to said surface formed by the first suspension in the chosen container.

10. A method according to claim 1, wherein said filtering is characterized by filtration pressure levels all of which remain below a level of pressure associated with a delivery of slurry into the filtration portion of the system substantially for a whole duration of said filtering.

11. A method according to claim 1, wherein said filtering is characterized by a rate of flow of the second suspension through a filter of the filtration portion of the system, wherein said rate of flow increases from a substantially zero level at a beginning of said filtering to a constant level and remains substantially unchanged at said constant level substantially for a whole duration of said filtering.

12. A method according to claim 1, further comprising performing said segregating during a segregating time that is substantially equal to a product of (i) a volume of a container used for holding the first suspension and (ii) a value that is reciprocal to a rate of a fluid flow representing said first suspension during said segregating.

* * * * *